US011401171B2

United States Patent
Kleinguetl et al.

(10) Patent No.: US 11,401,171 B2
(45) Date of Patent: Aug. 2, 2022

(54) APPARATUS, SYSTEMS, AND METHODS FOR IMPROVING SLOP WATER TREATMENT EFFICIENCY

(71) Applicant: HALLIBURTON ENERGY SERVICES, INC., Houston, TX (US)

(72) Inventors: Kevin G. Kleinguetl, Kingwood, TX (US); Brice Aaron Jackson, Houston, TX (US); Lawrence Joseph Herskovitz, Pearland, TX (US); Adam Dotson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 349 days.

(21) Appl. No.: 16/490,821

(22) PCT Filed: Dec. 13, 2018

(86) PCT No.: PCT/US2018/065356
§ 371 (c)(1),
(2) Date: Sep. 3, 2019

(87) PCT Pub. No.: WO2020/122911
PCT Pub. Date: Jun. 18, 2020

(65) Prior Publication Data
US 2021/0331941 A1  Oct. 28, 2021

(51) Int. Cl.
*C02F 1/00* (2006.01)
*B01D 21/00* (2006.01)
(Continued)

(52) U.S. Cl.
CPC .......... *C02F 1/008* (2013.01); *B01D 21/0084* (2013.01); *B01D 21/12* (2013.01);
(Continued)

(58) Field of Classification Search
CPC ...................................................... C02F 1/008
See application file for complete search history.

(56) References Cited

U.S. PATENT DOCUMENTS

| 7,497,954 B2 | 3/2009 | Ivan et al. |
| 2004/0031742 A1 | 2/2004 | Arnaud |
| 2004/0094483 A1* | 5/2004 | Mueller ................. B01D 17/00 210/708 |

FOREIGN PATENT DOCUMENTS

| KR | 10-1247356 B1 | 3/2013 |
| KR | 10-1645221 B1 | 8/2016 |

(Continued)

OTHER PUBLICATIONS

International Search Report and Written Opinion issued for International Application PCT/US2018/065356, ISA/KR, dated Sep. 11, 2019, 11 pages.

*Primary Examiner* — Peter Keyworth
(74) *Attorney, Agent, or Firm* — Haynes and Boone, LLP

(57) ABSTRACT

The present disclosure provides apparatus, systems, and methods for improving slop water treatment efficiency. The method generally includes separating contaminated fluid into a clean fluid layer and one or more contaminant layers floating on a surface of the clean fluid layer in a vessel; reporting to a control unit, a location, sensed by level sensor(s), of an interface between the clean fluid layer and the contaminant layer(s); reporting to the control unit, a height, sensed by a first position sensor, of a skimmer relative to the vessel; adjusting, using the control unit and based on the reported location of the interface and/or the reported height of the skimmer, the height of the skimmer so that one or more components of the skimmer are positioned proximate the sensed location of the interface; and skimming, using the skimmer, the contaminant layer(s) off of the clean fluid layer proximate the sensed interface.

6 Claims, 6 Drawing Sheets

(51) Int. Cl.
    *B01D 21/04*     (2006.01)
    *B01D 21/24*     (2006.01)
    *B01D 21/34*     (2006.01)
    *C02F 1/24*     (2006.01)
    *C02F 1/52*     (2006.01)
    C02F 101/32     (2006.01)

(52) U.S. Cl.
    CPC ..... *B01D 21/2427* (2013.01); *B01D 21/2438* (2013.01); *B01D 21/2444* (2013.01); *B01D 21/34* (2013.01); *C02F 1/24* (2013.01); *C02F 1/52* (2013.01); *B01D 2221/04* (2013.01); *C02F 2101/32* (2013.01); *C02F 2209/42* (2013.01)

(56) References Cited

FOREIGN PATENT DOCUMENTS

| | | | | |
|---|---|---|---|---|
| KR | 101645221 B1 | * | 8/2016 | ............ B01D 21/24 |
| KR | 10-2018-0029993 A | | 3/2018 | |

* cited by examiner

APPARATUS, SYSTEMS, AND METHODS FOR IMPROVING SLOP WATER TREATMENT EFFICIENCY

CROSS-REFERENCE TO RELATED APPLICATION

The present application is a U.S. National Stage patent application of International Patent Application No. PCT/US2018/065356, filed on Dec. 13, 2018, the benefit of which is claimed and the disclosure of which is incorporated herein by reference in its entirety.

TECHNICAL FIELD

The present disclosure relates generally to water treatment and, more particularly, to apparatus, systems, and methods for improving slop water treatment efficiency.

BACKGROUND

Conventional management of offshore drilling slops poses both economic and environmental challenges to drilling operations. For example, in some instances, at least some of the slops on an offshore rig (e.g., including oily slops resulting from rig cleaning and contaminated rain water) are transported to shore for treatment and disposal, depending on their composition. However, the transportation costs associated with such onshore treatment and disposal of offshore slops may be high (especially in large volumes). In addition to the high transportation costs, the process of transporting offshore slops to shore for treatment exposes operators to the hazards and risks associated with transport logistics. To mitigate the high transportation costs, hazards, and risks of transporting slops to an onshore treatment facility, conventional techniques for treating slops (e.g., oily slops) at the rig site have been developed. However, it would be desirable to improve upon these conventional techniques to increase efficiency and/or to further reduce costs while still enabling operators to comply with discharge and safety regulations. Such improved technique(s) could further reduce the volume of slops transported onshore for treatment, and thus the corresponding onshore treatment and disposal costs, hazards, and emissions. It would also be desirable for such an improved apparatus, system, or method to be (or remain) easily deployable and to occupy a small footprint (due to limited offshore deck space on the rig). Therefore, what is needed is a viable, efficient, and environmentally responsible alternative to conventional technique(s) of treating oily slops at the rig site.

DETAILED DESCRIPTION

Figure 1:
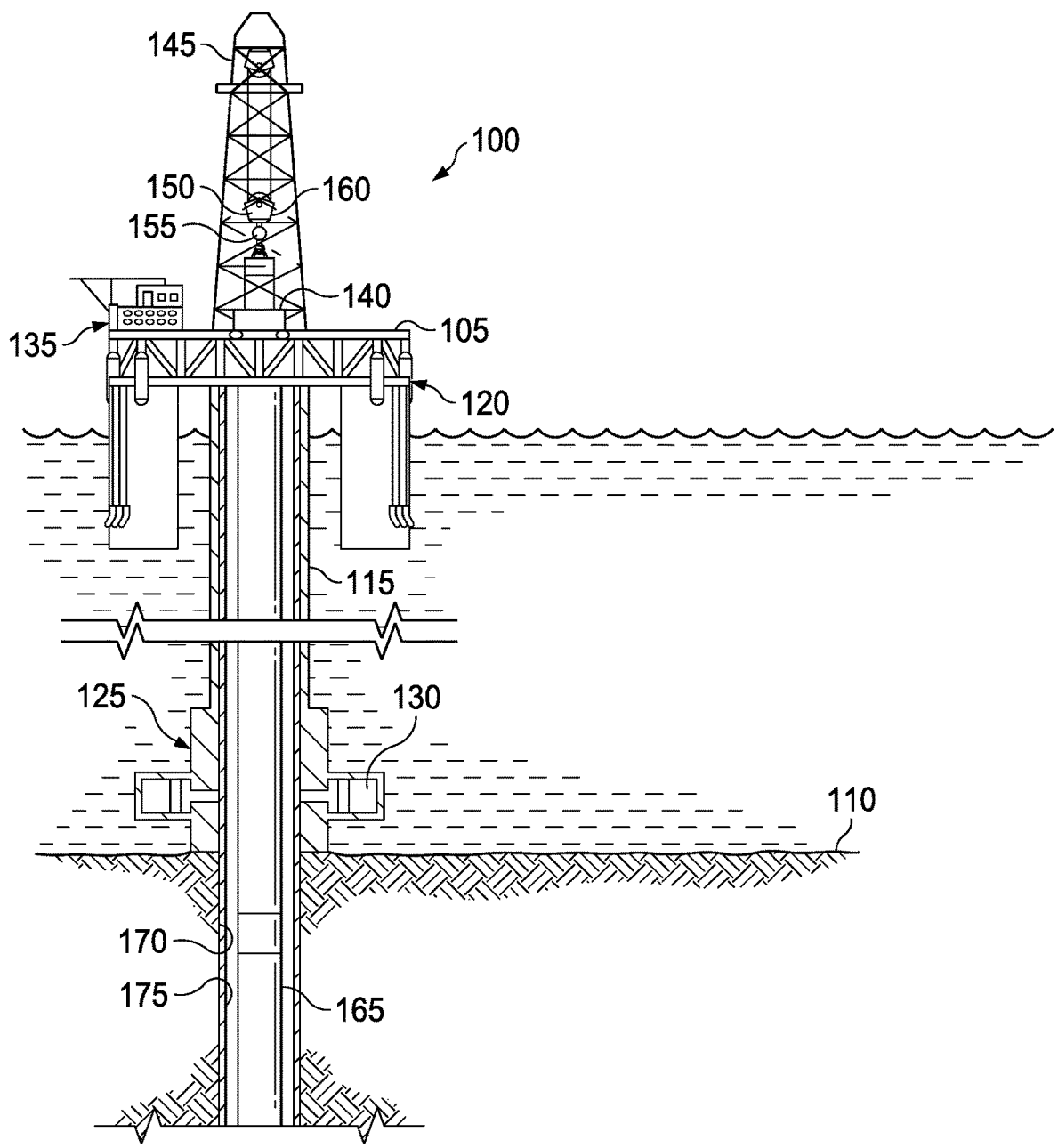
FIG. 1 is an elevational view of an offshore oil and gas rig including a slop treatment apparatus, according to one or more embodiments of the present disclosure.

The present disclosure provides apparatus, systems, and methods for improving slop water treatment efficiency using a slop treatment apparatus that is modular, highly efficient, and can treat a range of oily water slop produced on a rig—at the source. In the interest of clarity, not all features of an actual implementation are described in this specification. It will of course be appreciated that in the development of any such actual implementation, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Advantages of the various aspects of the present disclosure will become apparent from consideration of the following description and drawings. The following description and drawings may repeat reference numerals and/or letters in the various examples or figures. This repetition is for the purpose of simplicity and clarity and does not in itself dictate a relationship between the various embodiments and/or configurations discussed. Unless otherwise noted, even though a figure may depict an offshore operation, the various aspects of the present disclosure are equally well suited for use in onshore operations.

In some embodiments, the slop treatment apparatus of the present disclosure is, includes, or is part of Halliburton's BaraH$_2$O™ Slop Treatment Unit. In at least one embodiment, the processing principles of the present disclosure could rely on a combination of chemical treatment and dissolved air flotation (DAF) to separate and recover water from a slop feed stream directly at the rig site. Specifically, the chemical treatment flocculates and binds together particles in the slop feed stream, making them easier to separate, which then allows DAF to separate both the particles and oil from the slop water, leaving the effluent in an acceptable condition to be discharged to the environment or reused on the rig. In some embodiments, treatment rates using the combined chemical treatment and DAF processes range from about 50 bbl/hr to about 95 bbl/hr (about 8 m$^3$/hr to about 15 m$^3$/hr). In addition, or instead, the slop treatment apparatus of the present disclosure could be implemented using one or more other suitable separation techniques (other than DAF). In any case, the clean effluent from the slop treatment apparatus can then be discharged directly to the environment or reused in pit washing operations. In this regard, the slop treatment apparatus can be connected to any pit on the rig and combined with pit cleaning equipment as needed. The slop treatment apparatus of the present disclosure improves efficiency and solids tolerance (e.g., handling variable levels and types of contamination) as compared to conventional slop water treatment processes, and may reduce wastewater shipment volumes by up to 95 percent by producing clean effluent for discharge.

When performing slop water treatment offshore, field analysis of the discharged water is required. Specifically, local discharge requirements may set the level of total petroleum hydrocarbons (TPH) at which effluent may be discharged. The slop treatment apparatus of the present disclosure continuously monitors TPH levels to provide operators with the assurance that effluent discharges meet the relevant discharge requirements. For example, in some embodiments, the slop treatment apparatus can reach effluent TPH levels at or below 10 ppm (the TPH levels in the slop feed stream may start at 65 ppm or higher). In some embodiments, TPH monitoring is accomplished using in-line instrumentation. For example, the slop treatment apparatus may utilize field lab instrumentation and techniques to confirm TPH levels on a periodic basis. Such instrumentation may include an oil-in-water monitor designed to operate in hazardous environments and provide consistent, accurate, and uninterrupted measurements with remote data transfer capability. In this manner, the slop treatment apparatus reduces health and safety risks while ensuring that clean effluent is discharged overboard in accordance with environmental regulations, so that overall waste volumes are decreased while environmentally sound drilling practices are maintained.

In some embodiments, the slop treatment apparatus of the present disclosure is engineered for flexible placement wherever footprint is available on the rig. Specifically, the slop treatment apparatus may be configurable to fit easily into limited deck space while meeting all safety and discharge requirements. For example, the slop treatment apparatus may be fully enclosed in a 20-foot (6-meter) modular container, thus minimizing its footprint on the rig. Such a containerized slop treatment apparatus may be rigged up easily and quickly. As a result, the compact, rugged slop treatment apparatus is ideally suited for offshore operations with deck space constraints, including remotely located deep-water drill ships and semi-submersibles. Moreover, to conserve energy, the slop treatment apparatus of the present disclosure does not need to run continuously, but can instead be operated only when required, i.e., when the volume of slop water in the tank reaches a pre-determined level. In addition to on-demand operation for lower power usage, the slop treatment apparatus can also be easily shut down when no oily liquid wastes are generated by the rig, allowing for more efficient use of personnel.

Referring to FIG. 1, in an embodiment, an offshore oil and gas rig is schematically illustrated and generally referred to by the reference numeral 100. In an embodiment, the offshore oil and gas rig 100 includes a semi-submersible platform 105 that is positioned over a submerged oil and gas formation located below a sea floor 110. A subsea conduit 115 extends from a deck 120 of the platform 105 to a subsea wellhead installation 125. One or more pressure control devices 130, such as, for example, blowout preventers (BOPs), and/or other equipment associated with drilling or producing a wellbore may be provided at the subsea wellhead installation 125 or elsewhere in the system. Slops accumulated on the platform 105 (e.g., oily slops resulting from rig cleaning and contaminated rain water) during drilling and other operations are not suitable for effluent discharge and must undergo further treatment. Such treatment is provided by a slop treatment apparatus 135 positioned on the deck 120 of the platform 105 to ensure that clean effluent is discharged overboard in accordance with environmental regulations, as will be described in further detail below. The platform 105 may also include a hoisting apparatus 140, a derrick 145, a travel block 150, a hook 155, and a swivel 160, which components are together operable for raising and lowering a conveyance vehicle 165. The conveyance vehicle 165 may be, include, or be part of, for example, a casing, a drill string, a completion string, a work string, a pipe joint, coiled tubing, production tubing, other types of pipe or tubing strings, and/or other types of conveyance vehicles, such as wireline, slickline, and/or the like. The platform 105 may also include a kelly, a rotary table, a top drive unit, and/or other equipment associated with the rotation and/or translation of the conveyance vehicle 165. A wellbore 170 extends from the subsea wellhead installation 125 and through the various earth strata, including the submerged oil and gas formation. In some embodiments, as in FIG. 1, at least a portion of the wellbore 170 includes a casing 175 cemented therein.

Figure 2:
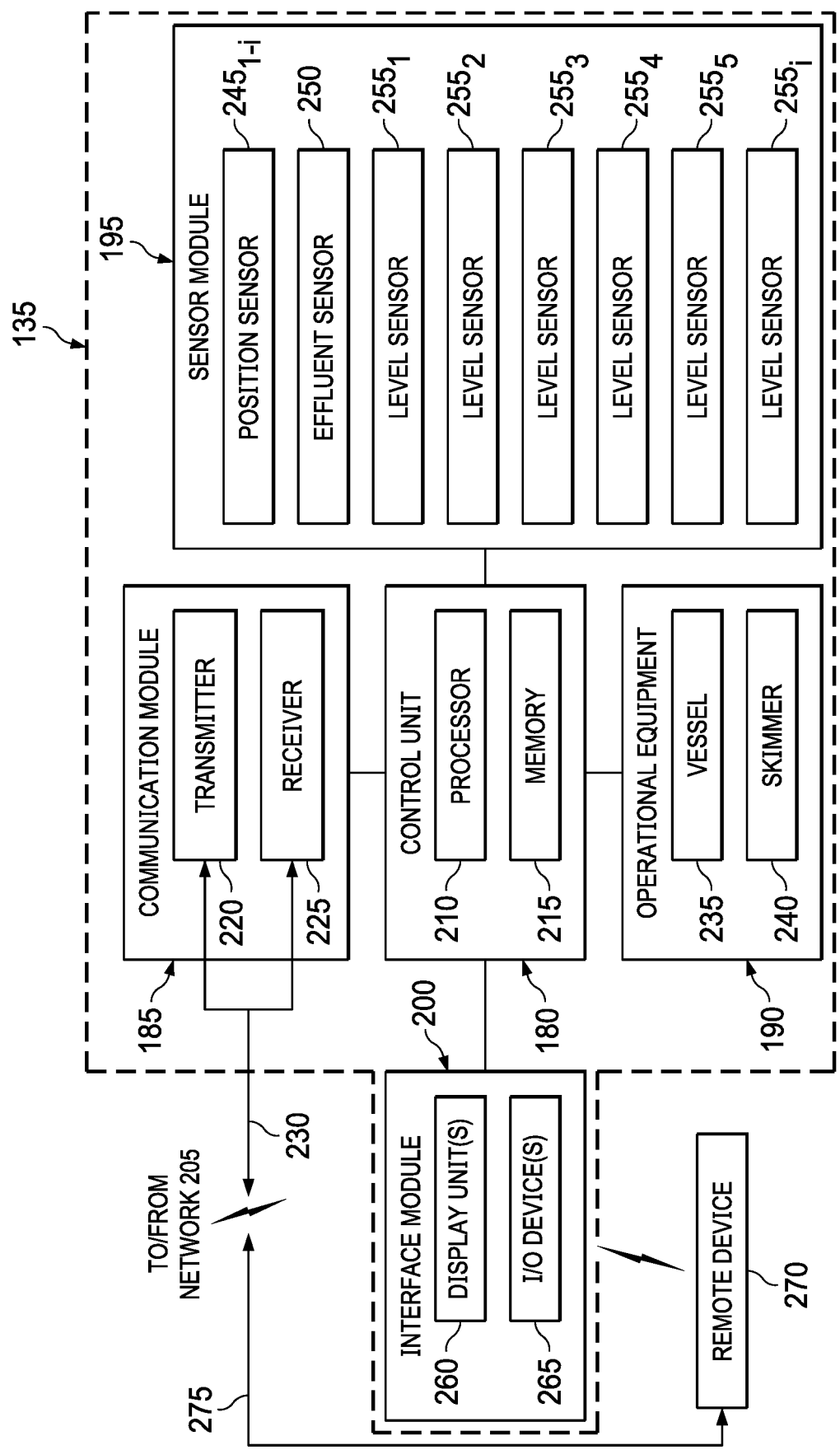
FIG. 2 is a detailed diagrammatic view of the slop treatment apparatus of FIG. 1, according to one or more embodiments of the present disclosure.

Referring to FIG. 2, a detailed diagrammatic view of the slop treatment apparatus 135 of FIG. 1 is illustrated. In some embodiments, the slop treatment apparatus 135 relies on a combination of chemical treatment and DAF to separate and recover water from the slop feed stream directly on the rig. The slop treatment apparatus 135 includes a control unit 180, a communication module 185, operational equipment 190, a sensor module 195, and an interface module 200. The communication module 185 is operably coupled to, and adapted to be in communication with, the control unit 180. In some embodiments, the communication module 185 may be adapted to communicate wirelessly with, and form a part of, a network 205 (e.g., a cellular network, a 3G network, a 4G network, a 5G network, a Wi-Fi network, an ad hoc network, or the like).

The operational equipment 190 is operably coupled to, and adapted to be in communication with, the control unit 180. The sensor module 195 is also operably coupled to, and adapted to be in communication with, the control unit 180. The sensor module 195 is adapted to monitor various components of, for example, the operational equipment 190 and/or the surrounding environment, as will be described in further detail below. The interface module 200 is also operably coupled to, and adapted to be in communication with, the control unit 180. In addition to, or instead of, being operably coupled to, and adapted to be in communication with, the control unit 180, the communication module 185, the operational equipment 190, the sensor module 195, and/or the interface module 200 may be operably coupled to, and adapted to be in communication with, one another via wired or wireless communication (e.g., via a wired or wireless network). In some embodiments, as in FIG. 2, the control unit 180 is adapted to communicate with the communication module 185, the operational equipment 190, the sensor module 195, and the interface module 200 to at least partially control the interaction of data with and between the various components of the slop treatment apparatus 135.

The control unit 180, the communication module 185, the operational equipment 190, the sensor module 195, and the interface module 200, alone or in any combination, may be or include one or more of the following: an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the particular component or components. Accordingly, one or more of the control unit 180, the communication module 185, the operational equipment 190, the sensor module 195, and/or the interface module 200 may be or include software modules or routines, while others may be or include hardware and/or equipment elements in communication with the control unit 180, the communication module 185, the operational equipment 190, the sensor module 195, and/or the interface module 200.

As shown in FIG. 2, the control unit 180 includes a processor 210 and a memory 215. In some embodiments, as in FIG. 2, the communication module 185, which is operably coupled to, and adapted to be in communication with, the control unit 180, includes a transmitter 220 and a receiver 225. In some embodiments, one or the other of the transmitter 220 and the receiver 225 may be omitted according to the particular application for which the communication module 185 is to be used. In some embodiments, the transmitter 220 and the receiver 225 are combined into a transceiver capable of both sending and receiving wireless signals. In any case, the transmitter 220 and the receiver 225 are adapted to send/receive data to/from the network 205, as indicated by arrow(s) 230. In some embodiments, as in FIG. 2, the operational equipment 190, which is operably coupled to, and adapted to be in communication with, the control unit 180, includes a plurality of devices configured to facilitate the removal of contaminants from a slop feed stream. In this regard, the operational equipment 190 may be designed to exchange communication with the control unit 180, so as to not only receive instructions, but to provide information regarding the operation of the operational equipment 190. For example, the operational equipment 190 may include, but is not limited to, a vessel 235 and an adjustable skimmer 240. The vessel 235 is adapted to accumulate contaminated fluid received via the slop feed stream. The adjustable skimmer 240 is adapted to skim contaminants off of a surface of the contaminated fluid accumulated in the vessel 235, as will be described in further detail below.

In some embodiments, as in FIG. 2, the sensor module 195, which is operably coupled to, and adapted to be in communication with, the control unit 180, includes devices such as sensors, meters, detectors, or other devices configured to measure or sense a parameter related to an operation of the slop treatment apparatus 135, as will be described in further detail below. For example, the sensor module 195 may include position sensors $245_{1-i}$ associated with, inter alia, the adjustable skimmer 240, an effluent sensor 250 associated with the vessel 235, and level sensors $255_{1-i}$ associated with one or both of the adjustable skimmer 240 and the vessel 235, as will be described in further detail below. The sensors or other detection devices are generally configured to sense or detect activity, conditions, and circumstances in an area to which the device has access. Sub-components of the sensor module 195 may be deployed at any operational area where readings regarding the operation of the slop treatment apparatus 135 may be taken. Readings from the sensor module 195 are fed back to the control unit 180. The reported data may include sensed data, or may be derived, calculated, or inferred from the sensed data. The control unit 180 may send signals to the sensor module 195 to adjust the calibration or operating parameters of the sensor module 195 in accordance with a control program in the control unit 180 (e.g. stored on the memory 215 and executable by the processor 210). The control unit 180 is adapted to receive and process data from the sensor module 195 or from other suitable source(s), and to monitor, store (e.g., in the memory 215), and/or otherwise process (e.g., using the processor 210) the received data.

In some embodiments, as in FIG. 2, the interface module 200, which is operably coupled to, and adapted to be in communication with, the control unit 180, includes at least one input and output device or system that enables a user to interact with the control unit 180 and the functions that the control unit 180 provides. For example, the interface module 200 may include a display unit 260 and an input/output ("I/O") device 265. The display unit 260 may be, include, or be part of multiple display units; accordingly, as used herein the reference numeral 260 may refer to one, or any combination, of the display units. The I/O device 265 may be, include, or be part of a communication port (e.g., a USB port), a Bluetooth communication interface, a touch-screen display unit, soft keys associated with a component of the slop treatment apparatus 135, and/or similar components. Other examples of sub-components that may be part of the interface module 200 include, but are not limited to, audible alarms, visual alerts, tactile alerts, telecommunications equipment, and computer-related components, peripherals, and systems.

In some embodiments, a remote device 270 may be coupled to, and adapted to be in communication with, the control unit 180 to remotely monitor and/or control the operation of the slop treatment apparatus 135, which operation will be described in further detail below. For example, the remote device 270 may communicate wirelessly with the communication module 185, as indicated by arrow 275. For another example, the remote device 270 may communicate with the control unit 180 via the interface module 200 (e.g., the I/O device 265) and the control unit 180. In an embodiment, the remote device 270 is a handheld or otherwise portable device. In some embodiments, the remote device 270 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several embodiments, the remote device 270 is a smartphone.

Figure 3A:
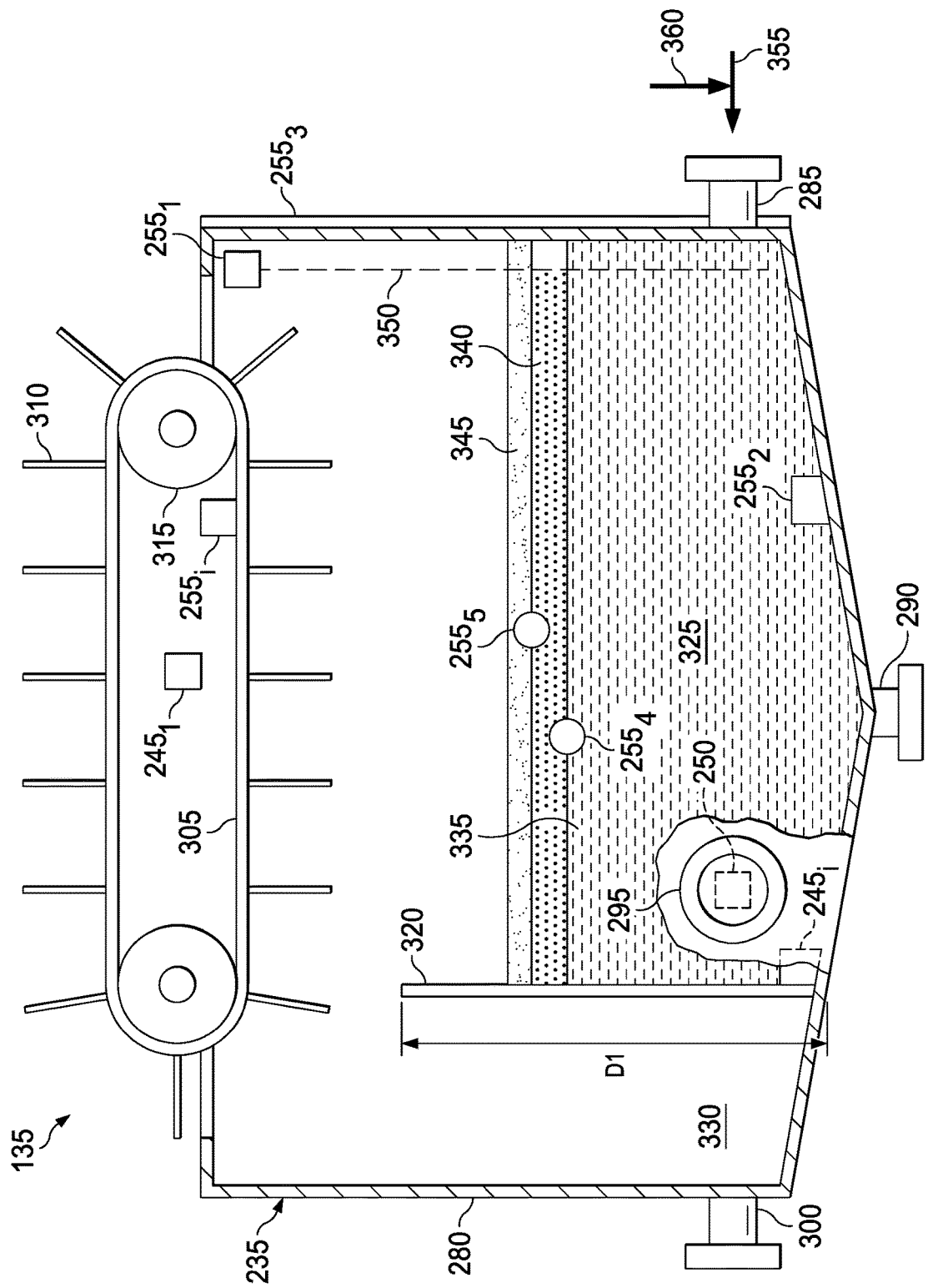
FIG. 3A is an elevation view of the slop treatment apparatus of FIGS. 1 and 2 in a first operational configuration, according to one or more embodiments of the present disclosure.
Figure 3B:
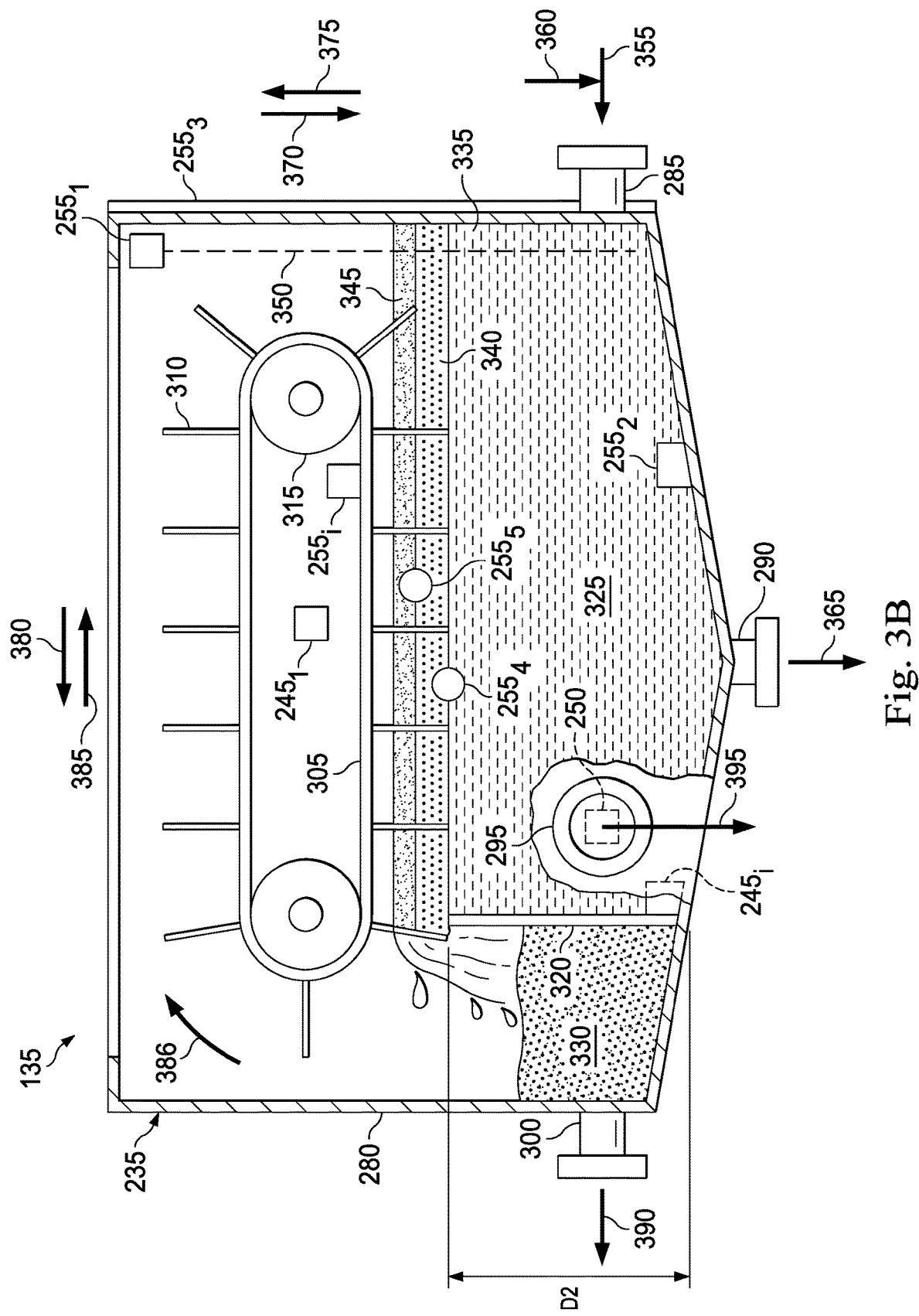
FIG. 3B is an elevation view of the slop treatment apparatus of FIG. 3A in a second operational configuration, according to one or more embodiments of the present disclosure.

Referring to FIGS. 3A-3B, an elevational view of the slop treatment apparatus 135 of FIGS. 1 and 2 is illustrated. As shown in FIG. 3A, the vessel 235 includes a holding tank 280, an inlet 285, an outlet 290, an outlet 295, and an outlet 300. The inlet 285 of the vessel 235 is adapted to receive a slop feed stream and (in some implementations) a chemical treatment fluid into the holding tank 280. The outlet 290 of the vessel 235 is adapted to discharge solids (e.g., heavy solids) that settle at the bottom of the holding tank 280. The outlet 295 of the vessel 235 is adapted to discharge clean effluent overboard in accordance with the relevant local environmental regulations. In some embodiments, as in FIGS. 3A and 3B, the adjustable skimmer 240 includes a belt 305 from which each of a plurality of skimming paddles 310 outwardly extends, the belt 305 being drivable on a pair of rollers 315 (e.g., at least one of which is a drive roller to which a drive motor (not shown) is operably coupled) so that the skimming paddles 310 are able to skim oil, contaminants, and/or other particles from the holding tank 280, as will be described in further detail below. Although one type of adjustable skimmer 240 has been described in detail herein, the adjustable skimmer 240 may be, or may be replaced with, any other type of skimmer suitable for use with the vessel 235.

In some embodiments, the slop treatment apparatus 135 also includes an adjustable weir 320 adapted to move vertically to facilitate improved skimming of the oil, contaminants, and/or other particles from the holding tank using the skimming paddles 310, as will be described in further detail below. The adjustable weir 320 divides the holding tank 280 into portions 325 and 330. The adjustable skimmer 240 is adapted to skim oil, contaminants, and/or other particles over the adjustable weir 320 and into the portion 330 of the holding tank 280, while leaving liquid and other solids in the portion 325 of the holding tank 280. The outlet 300 of the vessel 235 is adapted to discharge the skimmed oil, contaminants, and/or other particles from the holding tank 280. Each of the inlet 285, the outlet 290, the outlet 295, and the outlet 300 are or include an automatic and/or manual valve for controlling flow entering and exiting the holding tank 280; such valves, if automatic, may be operably coupled to, and adapted to communicate with, the control unit 180 of the slop treatment apparatus 135 so that the control unit 180 is able to monitor and control operation of the valves.

The position sensor $245_1$ is operably associated with the adjustable skimmer 240; for example, the position sensor $245_1$ may be adapted to detect the position and/or orientation of the adjustable skimmer 240 relative to the vessel 235. Likewise, the position sensor $245_i$ is operably associated with the adjustable weir 320; for example, the position sensor $245_i$ may be adapted to detect the position and/or orientation of the adjustable weir 320 relative to the holding tank 280. The effluent sensor 250 is located at least partially within the outlet 295 of the vessel 235; for example, the effluent sensor 250 may be or include field lab instrumentation adapted to confirm TPH levels in the effluent stream exiting the outlet 295 of the vessel 235. In at least one such implementation, the effluent sensor 250 is or includes an oil-in-water monitor designed to operate in hazardous environments and provide consistent, accurate, and uninterrupted measurements with remote data transfer capability. The level sensors $255_{1-i}$, alone or in combination, are adapted to detect an interface in the portion 325 of the holding tank 280 between a clean water layer 335 and an oil layer 340, and/or to detect an interface between the oil layer 340 and a layer 345 of contaminants or other solids.

More particularly, the level sensor $255_1$ is located at least partially within the portion 325 of the holding tank 280; for example, the level sensor $255_1$ may be or include a radio-frequency ("RF") guided wave depth sensor having a wave guide 350 at least partially submerged in the clean water layer 335 and extending from a location proximate a top portion of the holding tank 280 to a location proximate a bottom portion of the holding tank 280. The level sensor $255_2$ is located within the portion 325 of the holding tank 280; for example, the level sensor $255_2$ may be or include an ultrasonic emitter-receiver pair located proximate the bottom portion of the holding tank 280 and adapted to utilize ultrasonic pulses and time-of-flight calculations to determine the location of the interface between the clean water layer 335 and the oil layer 340, and/or to determine the location of the interface between the oil layer 340 and the layer 345 of contaminants or other solids. The level sensor $255_3$ is externally positioned on the vessel 235 adjacent the portion 325 of the holding tank 280; for example, the level sensor $255_3$ may be or include an externally mounted array of sensors (e.g., capacitive and/or infrared sensors) adapted to sense, based on changes in their respective measured outputs, the location of the interface between the clean water layer 335 and the oil layer 340, and/or to determine the location of the interface between the oil layer 340 and the layer 345 of contaminants or other solids. In addition, or instead, the level sensor $255_3$ may be or include a manually and/or automatically movable sensor capable of moving vertically and/or horizontally while continuously outputting the measured location of the interface between the clean water layer 335 and the oil layer 340, and/or the measured location of the interface between the oil layer 340 and the layer 345 of contaminants or other solids.

The level sensors $255_{4-5}$ is located within the portion 325 of the holding tank 280; for example, the level sensor $255_4$ may be or include a float (e.g., a magnetic and/or visual float) adapted to sense, based on its own position, the location of the interface between the clean water layer 335 and the oil layer 340; for another example, the level sensor $255_5$ may be or include a float (e.g., a magnetic and/or visual float) adapted to sense, based on its own position, the location of the interface between the oil layer 340 and the layer 345 of contaminants or other solids. The level sensor $255_i$ is operably associated with the adjustable skimmer 240; for example, the level sensor $255_i$ may be or include one or more sensors (e.g., sonar, radar, LIDAR, or the like) adapted to detect, in relation to the adjustable skimmer 240 (e.g., based at least partially on the position/orientation readings received from the position sensors $245_1$), the location of the interface between the clean water layer 335 and the oil layer 340, and/or to the location of the interface between the oil layer 340 and the layer 345 of contaminants or other solids.

Although locations for each of the level sensors $255_{1-i}$ have been described herein, in other embodiments one or more of the level sensors $255_{1-i}$ may relocated in place of one or more others of the level sensors $255_{1-i}$. Likewise, although example components for each of the level sensors $255_{1-i}$ have been described herein, in other implementations one or more components of each of the level sensors $255_{1-i}$ may be, include, or be replaced with one or more other components of the level sensors $255_{1-i}$. In addition, or instead, one or more components of each of the level sensors $255_{1-i}$ may be, include, or be replaced with another component (e.g., a float, a displacer, a pressure sensor, a bubbler, a capacitance sensor, a level sensor, a distance sensor, a LIDAR sensor, a radar sensor, a sonar sensor, another laser or high frequency device, or any combination thereof).

Referring still to FIGS. 3A and 3B, in operation, the slop treatment apparatus 135 is used to treat oily slops on the offshore oil and gas rig 100 while enabling operator(s) to comply with discharge and safety regulations. More particularly, as shown in FIG. 3A, a slop feed stream is received into the vessel 235, as indicated by arrow 355. Before, during, or after, the slop feed stream is received into the vessel 235, a treatment fluid is mixed with the slop feed stream, as indicated by arrow 360. The treatment fluid may be or include one or more de-oiling polymers such as, for example, a coagulant and/or a flocculant. In any case, the chemical treatment of the slop feed stream by the treatment fluid facilitates removal of contaminants from the slop feed stream. The type of treatment fluid and the order and timing of its addition to the slop feed stream may vary according to the specific composition of the slop feed stream (e.g., based on characteristics of the slop feed stream and type(s) of surfactant previously used) (small laboratory-scale test(s) may be carried out on a sample of the slop feed stream to determine the optimum treatment). The treated slop feed stream flows into the portion 325 of the holding tank 280 via the inlet 285 at a predetermined rate that is determined based on the chemical characteristics of the treated slop feed stream.

In some embodiments, as in FIGS. 3A and 3B, before, during, or after flowing into the portion 325 of the holding tank 280 via the inlet 285, the treated slop feed stream undergoes dissolved air flotation ("DAF"), which is a process by which suspended solids, oil, and/or other contaminants are removed from the treated slop feed stream via air bubble flotation. More particularly, the process involves dissolving air into water under pressure and injecting the air/water mixture into the treated slop feed stream. Once so injected, the pressure is released, and the air comes out of solution, producing bubbles, which attach themselves to contaminant material in the treated slop feed stream (e.g., in the holding tank 280. As a result, the buoyancy of the contaminant material is increased and floats to the surface to create the clean water layer 335, the oil layer 340, and the layer 345 of contaminants or other solids. In some embodiments, DAF is accomplished by dissolving air into water and releasing the air/water mixture proximate the bottom of the portion 325 of the holding tank 280 (e.g., using a dissolved air introduction apparatus. After the treated slop feed stream flows into the portion 325 of the holding tank 280 via the inlet 285, any heavy solids are allowed to settle to the bottom of the portion 325 of the holding tank 280 so that they may be subsequently directed to the outlet 290 of the vessel 235, as indicated by arrow 365 in FIG. 3B.

Once the buoyancy of the contaminant material is increased and floats to the surface to create the clean water layer 335, the oil layer 340, and the layer 345 of contaminants or other solids, the adjustable weir 320 is positioned (e.g., via control signals received from the control unit 180) so that its top portion extends at least proximate the interface between the clean water layer 335 and the oil layer 340, and/or the interface between the oil layer 340 and the layer 345 of contaminants or other solids; for example, to properly position the adjustable weir 320 with respect to the clean water layer 335, the oil layer 340, and/or the layer 345 of contaminants or other solids, the adjustable weir 320 may be lowered in a vertical direction 370 and/or raised in a vertical direction 375. More particularly, the adjustable weir 320 may be vertically repositioned from the location illustrated in FIG. 3A, in which the top portion of the adjustable weir 320 extends a distance D1 from the bottom portion of the holding tank 280, to the location illustrated in FIG. 3B, in which the top portion of the adjustable weir extends a distance D2 from the bottom portion of the holding tank 280. The distance D2 shown in FIG. 3B is smaller than the distance D1 shown in FIG. 3A; however, in other embodiments, the distance D2 may be larger than the distance D1, depending on the vertical location of the layers 335, 340, and/or 345 within the portion 325 of the holding tank 280. In addition, or instead, once the buoyancy of the contaminant material is increased and floats to the surface to create the clean water layer 335, the oil layer 340, and the layer 345 of contaminants or other solids, the adjustable skimmer 240 (which is located over the top of the portion 325 of the holding tank 280) is positioned so that one or more of the skimming paddles 310 extend at least proximate the interface between the clean water layer 335 and the oil layer 340, and/or the interface between the oil layer 340 and the layer 345 of contaminants or other solids; for example, to properly position the skimming paddles 310 with respect to the clean water layer 335, the oil layer 340, and/or the layer 345 of contaminants or other solids, the adjustable skimmer 240 may be lowered in the vertical direction 370, raised in the vertical direction 375, moved in a horizontal direction 380, and/or moved in a horizontal direction 385.

The degree to which the adjustable skimmer 240 and/or the adjustable weir 320 must be moved to properly position them with respect to the layers 335, 340, and/or 345 is determined by comparing, using the control unit 180, the current position(s) of the adjustable skimmer 240 and/or the adjustable weir 320, as reported to the control unit 180 by the position sensors $245_{1-r}$, with the corresponding position (s) of the layers 335, 340, and/or 345, as reported to the control unit 180 by the level sensors $255_{1-i}$. Once the adjustable skimmer 240 and/or the adjustable weir 320 are properly positioned with respect to the layers 335, 340, and/or 345, the skimmer is energized to rotate the skimming paddles 310, as indicated by arrow 386, which skimming paddles 310, when so energized, push the contaminants in the layers 340 and/or 345 (e.g., oil, solids, flocculants, coagulants, froth, or the like) over the top portion of the adjustable weir 320 and into the portion 330 of the holding tank 280. The contaminants collected in the portion 330 of the holding tank 280 are subsequently discharged through the outlet 300 of the vessel 235, as indicated by arrow 390. The remaining clean water within the portion 325 of the holding tank 280 is discharged as clean effluent through the outlet 295 of the vessel 235, as indicated by arrow 395. During such discharge of the clean effluent via the outlet 295 of the vessel 235, the effluent sensor 250 located at least partially within the outlet 295 measures and reports TPH levels to the control unit 180 to ensure strict compliance with local discharge and safety regulations. In some embodiments, rather than being discharged overboard as effluent, the clean water from the outlet 295 of the vessel 235 may be directed through a water reuse line to be reused in other processes on the offshore oil and gas rig 100.

Figure 4:
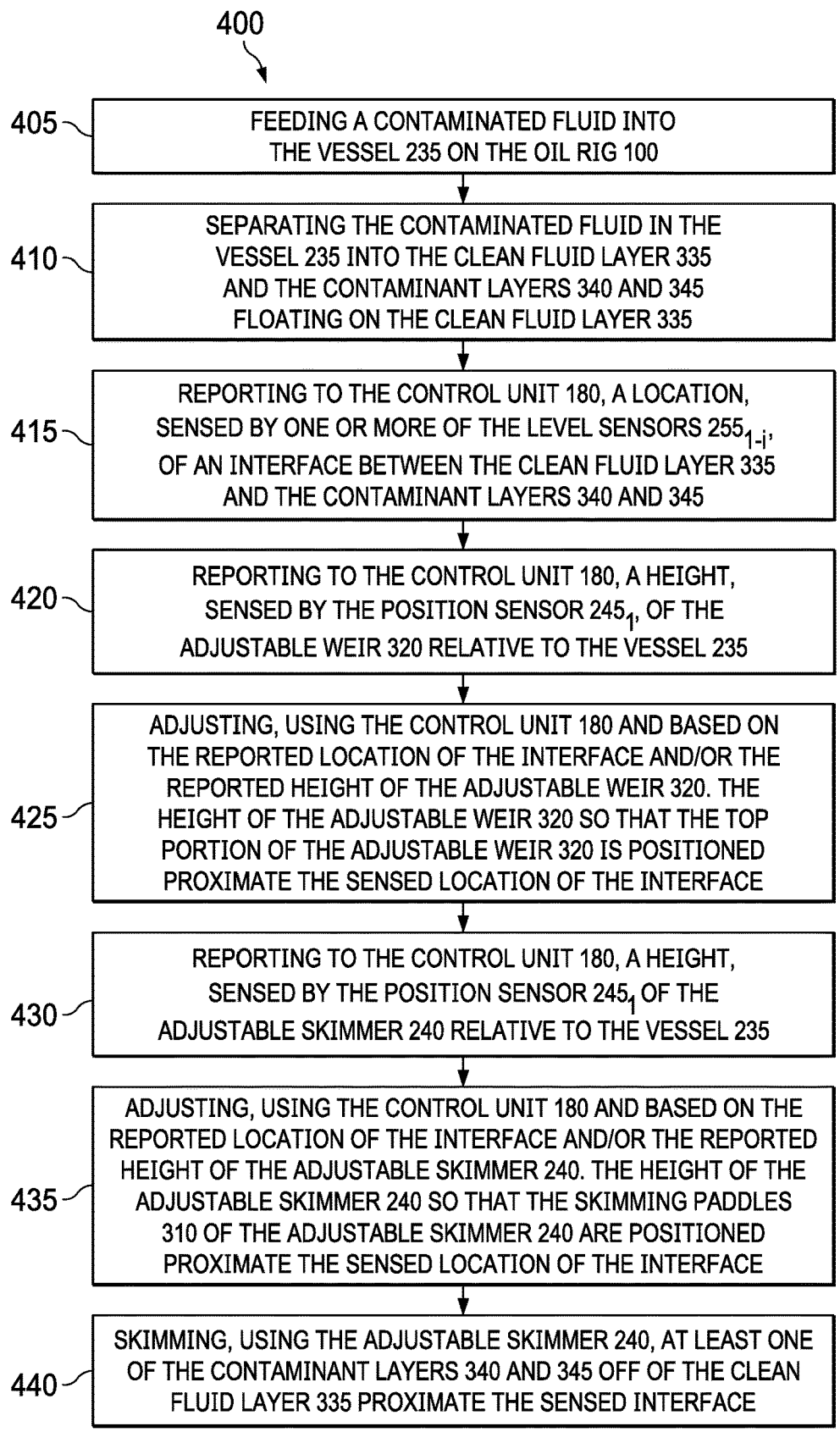
FIG. 4 is a flow diagram of a method for implementing one or more embodiments of the present disclosure.

Referring to FIG. 4, a method of using the slop treatment apparatus 135 is generally referred to by the reference numeral 400. The method 400 includes at a step 405 feeding a contaminated fluid into the vessel 235 on the oil rig 100. In some embodiments, the step 405 includes feeding the contaminated fluid into the portion 325 of the vessel 235. At a step 410, the contaminated fluid is separated in the vessel 235 into the clean fluid layer 335 and the contaminant layers 340 and 345 floating on the clean fluid layer 335. In some embodiments, the step 410 includes treating the contaminated fluid with a treatment fluid and removing contaminants from the contaminated fluid using dissolved air flotation. At a step 415, a location, sensed by one or more of the level sensors $255_{1-i}$, of an interface between the clean fluid layer 335 and the contaminant layers 340 and 345 is reported to the control unit 180. At a step 420, a height, sensed by the position sensor $245_1$, of the adjustable weir 320 relative to the vessel 235 is reported to the control unit 180. At a step 425, using the control unit 180 and based on the reported location of the interface and/or the reported height of the adjustable weir 320, the height of the adjustable weir 320 is adjusted so that the top portion of the adjustable weir 320 is positioned proximate the sensed location of the interface. In some embodiments, the steps 415, 420, and 425 may be executed repeatedly and/or continuously to maintain the position of the top portion of the adjustable weir 320 proximate the sensed location of the interface.

At a step 430, a height, sensed by the position sensor $245_1$, of the adjustable skimmer 240 relative to the vessel 235 is reported to the control unit 180. At a step 435, using the control unit 180 and based on the reported location of the interface and/or the reported height of the adjustable skimmer 240, the height of the adjustable skimmer 240 is adjusted so the skimming paddles 310 of the adjustable skimmer 240 are positioned proximate the sensed location of the interface. In some embodiments, the steps 415, 430, and 435 may be executed repeatedly and/or continuously to maintain the position of the skimming paddles 310 of the adjustable skimmer 240 proximate the sensed location of the interface. Finally, at a step 440, the adjustable skimmer 240 skims at least one of the contaminant layers 340 and 345 off of the clean fluid layer 335 proximate the sensed interface. In some embodiments, the step 440 includes skimming the at least one of the contaminant layers 340 and 345 into the portion 330 of the vessel 235. In some embodiments, the method 400 further includes, after separating the contaminated fluid into the clean fluid layer 335 and the contaminant layers 340 and 345, discharging at least a portion of the clean fluid layer 335 from the oil rig 100 as effluent. In at least one such embodiment of the method 400, the oil rig 100 is an offshore oil rig.

In some embodiments, in addition to the various advantages discussed herein, the operation of the slop treatment apparatus 135 and/or the execution of the method 400 decreases the amount of water from the layer 335 that is ultimately discharged through the outlet 300 of the vessel 235 together with the contaminants from the layers 340 and/or 345 skimmed by the adjustable skimmer 240 into the portion 330 of the holding tank 280; as a result, the overall costs (logistical and otherwise) associated with disposing of the materials discharged through the outlet 300 of the vessel 235 are decreased.

Figure 5:
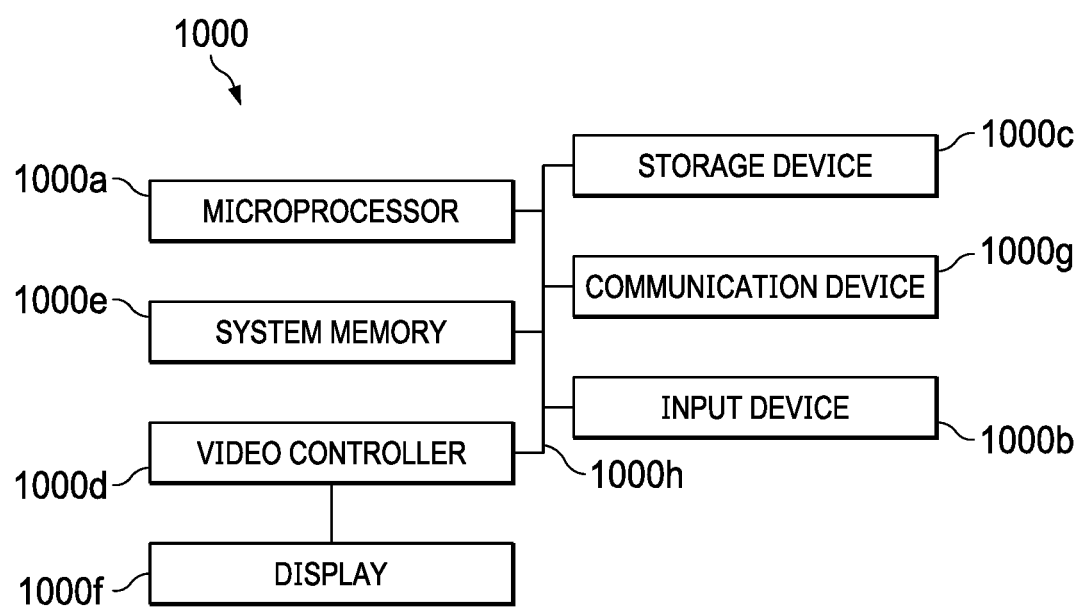
FIG. 5 is a diagrammatic illustration of a computing node for implementing one or more embodiments of the present disclosure.

Referring to FIG. 5, in an embodiment, a computing node 1000 for implementing one or more embodiments of one or more of the above-described elements, control units (e.g., 180), apparatus (e.g., 135), methods (e.g., 400) and/or steps (e.g., 405, 410, 415, 420, 425, 430, 435, and/or 440), or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several embodiments, the storage device 1000c may include a floppy drive, hard drive, CD-ROM, optical drive, any other form of storage device or any combination thereof. In several embodiments, the storage device 1000c may include, and/or be capable of receiving, a floppy disk, CD-ROM, DVD-ROM, or any other form of computer-readable medium that may contain executable instructions. In several embodiments, the communication device 1000g may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, control units (e.g., 180), apparatus (e.g., 135), methods (e.g., 400) and/or steps (e.g., 405, 410, 415, 420, 425, 430, 435, and/or 440), or any combination thereof. In several embodiments, such a processor may include one or more of the microprocessor 1000a, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A method has been disclosed. The method generally includes feeding a contaminated fluid into a vessel on an oil rig; separating the contaminated fluid into a clean fluid layer and one or more contaminant layers floating on a surface of the clean fluid layer; reporting to a control unit, a location, sensed by one or more level sensors, of an interface between the clean fluid layer and the one or more contaminant layers; reporting to the control unit, a height, sensed by a first position sensor, of a skimmer relative to the vessel; adjusting, using the control unit and based on the reported location of the interface and/or the reported height of the skimmer, the height of the skimmer so that one or more components of the skimmer are positioned proximate the sensed location of the interface; and skimming, using the skimmer, at least one of the one or more contaminant layers off of the clean fluid layer proximate the sensed interface.

The foregoing method embodiment may include one or more of the following elements, either alone or in combination with one another:

An interior of the vessel is divided into first and second portions by a weir; the method further includes, before skimming, using the skimmer, the at least one of the one or more contaminant layers off of the clean fluid layer: reporting to the control unit, a height, sensed by a second position sensor, of the weir relative to the vessel; and adjusting, using the control unit and based on the reported location of the interface and/or the reported height of the weir, the height of the weir so that a top portion of the weir is positioned proximate the sensed location of the interface.

The step of feeding the contaminated fluid into the vessel includes feeding the contaminated fluid into the first portion of the vessel.

The step of skimming, using the skimmer, the at least one of the one or more contaminant layers off of the clean fluid layer proximate the sensed interface includes skimming the at least one of the one or more contaminant layers into the second portion of the vessel.

The step of separating the contaminated fluid into the clean fluid layer and the one or more contaminant layers includes: treating the contaminated fluid with a treatment fluid; and removing contaminants from the contaminated fluid using dissolved air flotation.

The method further includes, after separating the contaminated fluid into the clean fluid layer and the one or more contaminant layers, discharging at least a portion of the clean fluid layer from the oil rig as effluent.

The oil rig is an offshore oil rig.

An apparatus has also been disclosed. The apparatus generally includes a vessel into which contaminated fluid is adapted to be fed, the vessel being located on an oil rig, wherein the contaminated fluid is adapted to be separated in the vessel into a clean fluid layer and one or more contaminant layers floating on a surface of the clean fluid layer; a skimmer positioned above at least a portion of the vessel; one or more level sensors adapted to sense a location of an interface between the clean fluid layer and the one or more contaminant layers; a first position sensor adapted to sense a height of the skimmer relative to the vessel; and a control unit to which the one or more level sensors is/are adapted to report the sensed location of the interface, and to which the first position sensor is adapted to report the sensed height of the skimmer; wherein the control unit is adapted to adjust the height of the skimmer, based on the reported location of the interface and/or the reported height of the skimmer, so that one or more components of the skimmer are positioned proximate the sensed location of the interface; and wherein after the control unit adjusts the height of the skimmer, the skimmer is adapted to skim at least one of the one or more contaminant layers off of the clean fluid layer proximate the sensed interface.

The foregoing apparatus embodiment may include one or more of the following elements, either alone or in combination with one another:

The apparatus further includes: a weir that divides an interior of the vessel into first and second portions; and a second position sensor adapted to sense a height of the weir relative to the vessel, and to report the sensed height of the weir to the control unit; wherein, before the skimmer skims the at least one of the one or more contaminant layers off of the clean fluid layer proximate the sensed interface, the control unit is adapted to adjust the height of the weir, based on the reported location of the interface and/or the reported height of the weir, so that a top portion of the weir is positioned proximate the sensed location of the interface.

The contaminated fluid is adapted to be fed into the first portion of the vessel.

The skimmer is adapted to skim the at least one of the one or more contaminant layers off of the clean fluid layer into the second portion of the vessel.

To separate the contaminated fluid into the clean fluid layer and the one or more contaminant layers in the vessel, the contaminated fluid is adapted to be treated with a treatment fluid and contaminants are adapted to be removed from the contaminated fluid using dissolved air flotation.

After the contaminated fluid is separated into the clean fluid layer and the one or more contaminant layers, the vessel is adapted to discharge at least a portion of the clean fluid layer from the oil rig as effluent.

The oil rig is an offshore oil rig.

A system has also been disclosed. The system generally includes a non-transitory computer readable medium; and a plurality of instructions stored on the non-transitory computer readable medium and executable by one or more processors, the plurality of instructions including: instructions that, when executed, cause the one or more processors to sense, using one or more level sensor, a location of an interface between a clean fluid layer and one or more contaminant layers separated within a vessel to which a contaminated fluid has been fed, and to report the sensed location of the interface to a control unit; instructions that, when executed, cause the one or more processors to sense, using a first position sensor, a height of a skimmer relative to the vessel, and to report the sensed height of the skimmer to the control unit; instructions that, when executed, cause the one or more processors to adjust, using the control unit and based on the reported location of the interface and/or the reported height of the skimmer, the height of the skimmer so that one or more components of the skimmer are positioned proximate the sensed location of the interface; and instructions that, when executed, cause the one or more processors to skim, using the skimmer, at least one of the one or more contaminant layers off of the clean fluid layer proximate the sensed interface.

The foregoing system embodiment may include one or more of the following elements, either alone or in combination with one another:

An interior of the vessel is divided into first and second portions by a weir; and the plurality of instructions further include: instructions that, when executed, cause the one or more processors to sense, using a second position sensor, a height of the weir relative to the vessel, and to report the sensed height of the weir to the control unit; and instructions that, when executed, cause the one or more processors to adjust, using the control unit and based on the reported location of the interface and/or the reported height of the weir, the height of the weir so that a top portion of the weir is positioned proximate the sensed location of the interface.

The contaminated fluid that has been fed into the vessel was fed into the first portion of the vessel.

Execution of the instructions that, when executed, cause the one or more processors to skim, using the skimmer, the at least one of the one or more contaminant layers off of the clean fluid layer proximate the sensed interface, causes the skimmer to skim the at least one of the one or more contaminant layers into the second portion of the vessel.

The clean fluid layer and the one or more contaminant layers that have been separated from the contaminated fluid were separated from the contaminated fluid by: treating the contaminated fluid with a treatment fluid; and removing contaminants from the contaminated fluid using dissolved air flotation.

The plurality of instructions further include instructions that, when executed, cause the one or more processors to discharge at least a portion of the clean fluid layer from the oil rig as effluent; wherein the oil rig is an offshore oil rig.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims.

What is claimed is:

1. A method, comprising:
    feeding a contaminated fluid into a vessel on an oil rig, wherein an interior of the vessel is divided into first and second portions by a weir;
    separating the contaminated fluid into a clean fluid layer and one or more contaminant layers floating on a surface of the clean fluid layer;
    reporting to a control unit, a location sensed by one or more level sensors of an interface between the clean fluid layer and the one or more contaminant layers;
    reporting to the control unit, a height sensed by a first position sensor of a skimmer relative to the vessel;
    adjusting, using the control unit and based on at least one of the reported location of the interface or the reported height of the skimmer, the height of the skimmer so that one or more components of the skimmer are positioned proximate the sensed location of the interface;
    reporting, to the control unit, a height sensed by a second position sensor of the weir relative to the vessel;
    adjusting, using the control unit and based on at least one of the reported location of the interface or the reported height of the weir, the height of the weir so that a top portion of the weir is positioned proximate the sensed location of the interface; and
    skimming, using the skimmer, at least one of the one or more contaminant layers off of the clean fluid layer proximate the sensed interface.

2. The method of claim 1, wherein the step of feeding the contaminated fluid into the vessel comprises feeding the contaminated fluid into the first portion of the vessel.

3. The method of claim 1, wherein the step of skimming, using the skimmer, the at least one of the one or more contaminant layers off of the clean fluid layer proximate the sensed interface comprises skimming the at least one of the one or more contaminant layers into the second portion of the vessel.

4. The method of claim 1, wherein the step of separating the contaminated fluid into the clean fluid layer and the one or more contaminant layers comprises:
    treating the contaminated fluid with a treatment fluid; and
    removing contaminants from the contaminated fluid using dissolved air flotation.

5. The method of claim 1, further comprising, after separating the contaminated fluid into the clean fluid layer and the one or more contaminant layers, discharging at least a portion of the clean fluid layer from the oil rig as effluent.

6. The method of claim 5, wherein the oil rig is an offshore oil rig.

* * * * *